(12) United States Patent
Kretzer

(10) Patent No.: US 6,461,234 B1
(45) Date of Patent: Oct. 8, 2002

(54) MOUNTING WALL

(75) Inventor: Adolf Kretzer, Siegen (DE)

(73) Assignee: Electrolux Siegen GmbH, Siegen (DE)

( * ) Notice: Subject to any disclaimer, the term of this patent is extended or adjusted under 35 U.S.C. 154(b) by 0 days.

(21) Appl. No.: 09/305,618

(22) Filed: May 5, 1999

(30) Foreign Application Priority Data

May 6, 1998 (DE) .................................... 298 08 181 U

(51) Int. Cl.$^7$ ................................................ F24F 7/10
(52) U.S. Cl. ........................................ 454/237; 62/244
(58) Field of Search ........................ 454/237; 62/428, 62/244, 454, 455

(56) References Cited

U.S. PATENT DOCUMENTS

| 3,245,224 A | * | 4/1966 | Wilkinson | 454/237 |
| 3,771,320 A | * | 11/1973 | Kenneryd et al. | 62/239 |
| 4,133,336 A | * | 1/1979 | Smith | 126/21 A |
| 4,505,126 A | * | 3/1985 | Jones et al. | 62/239 |
| 4,773,391 A | * | 9/1988 | Alexander | 126/361 |
| 5,291,749 A | * | 3/1994 | Schulak | 62/183 |
| 5,946,929 A | * | 9/1999 | Selina et al. | 62/263 |

* cited by examiner

Primary Examiner—Jiping Lu
(74) Attorney, Agent, or Firm—Pearne & Gordon LLP

(57) ABSTRACT

A recreational vehicle wall structure is provided with an access opening permitting servicing of an appliance, such as a refrigerator, from the exterior of the vehicle. The opening can be sized to allow the appliance to project into the opening to increase the usable interior volume of the vehicle. A cover for closing the opening can include ventilating openings.

13 Claims, 2 Drawing Sheets

MOUNTING WALL

BACKGROUND OF THE INVENTION

The present invention relates to an exterior wall structure, or mounting wall, such as for use in recreational vehicles.

In recreational vehicles, it is generally known to arrange kitchen appliances, such as refrigerators, and other devices to be ventilated, within the interior of the vehicle as defined by its exterior walls. For ventilation of a device, one or several openings covered by ventilating grids are provided for in the external walls of the vehicle. Against the interior surface of the ventilated external wall of the vehicle, the device is arranged such that the backside of the device can be ventilated through the ventilating grids.

For maintenance of the device, it is moved into the interior of the vehicle in order to be able to carry out the required maintenance or repairs on the backside of the device. This is inefficient, since the devices in most cases have to be held by several fixation means which have to be detached for maintenance purposes. A further disadvantage lies in that the useful volume within the vehicle is not used optimally, as the device, at best, is positioned directly on the interior surface of the external wall of the vehicle. The external wall of the vehicle, however, for safety and insulation reasons is about 4 cm thick, such thickness not being structurally required at the backside of the device to be ventilated.

SUMMARY OF THE INVENTION

It is, therefore, an object of the present invention to provide a wall structure for a recreational vehicle, which optimizes the inside space of the vehicle and by which maintenance work can be performed from the vehicle exterior on a device such as a kitchen appliance.

In accordance with the invention, a movable, panel-like cover member is provided on an exterior wall of the vehicle covering an opening in the wall permitting access to the backside of the device from the exterior of the vehicle so as to provide a lockable service opening. In order to have access to the backside of the device, for maintenance purposes, the lockable service opening is provided for in the exterior wall against which the device is mounted so that an expensive de-installation of the device is no longer required. In case of a service opening sized to match the geometry of the device, the device, furthermore, can be positioned closer to the external wall of the vehicle than would be possible in case of a continuous vehicle wall.

In a preferred embodiment of the invention, the service opening is closed by a lockable cover member containing at least one opening for ventilation and aeration. Thereby, the cover member can be constructed in large-area design, it preferably having low thickness in order to increase the useful interior volume in the vehicle. Preferably, the cover member is a hinged flap or a cover plate fastened detachably, which preferably can also be positioned on the external wall of the vehicle. For avoiding entrance of dust, ventilation grids (e.g., filters) are provided for in the cover member.

In a preferred embodiment of the invention, the openings for ventilation and aeration are connected to the device by means of flexible hoses, so that the device can be positioned in the vehicle in accordance with the individual needs and requirements and the space behind the device can be used for other purposes. Simple installation of the flexible hoses is achieved by fixation of clamp connections to the opening.

In the following, the invention is described with reference to preferred embodiments and to the attached drawings.

DETAILED DESCRIPTION OF PREFERRED EMBODIMENT

Figure 1:
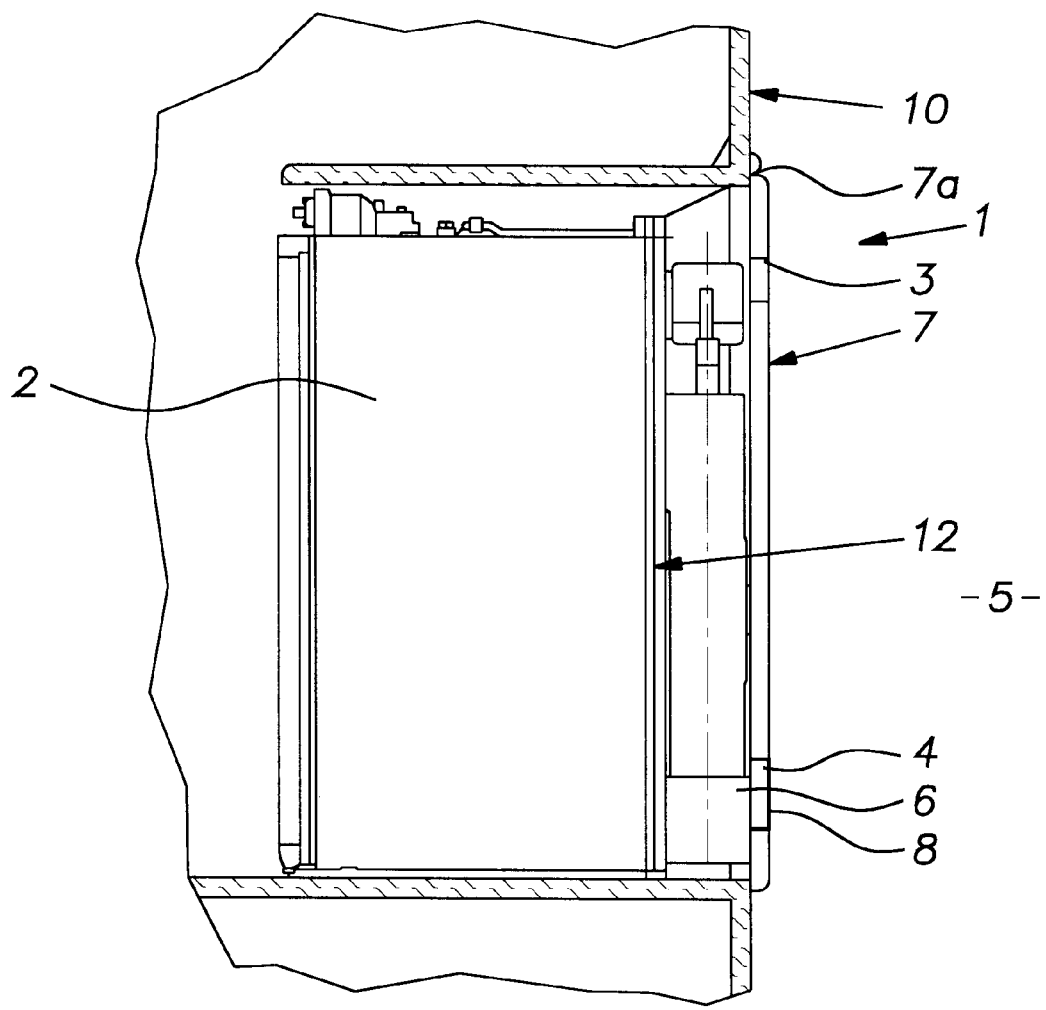
FIG. 1 shows a first embodiment of an exterior recreational vehicle wall or mounting wall in accordance with the present invention in side view.

The exterior recreational vehicle wall structure 10, or mounting wall, shown in FIG. 1, comprises a service opening 6 closed by a cover member 7 in form of a flap or panel. The panel 7 may be attached to the exterior wall structure 10 by a hinge 7a or some other appropriate method. Behind said service opening 6 a device 2, e.g. a refrigerator, is arranged whose backside is accessible from the exterior of the vehicle through said service opening 6. For ventilation of said device 2, several openings for ventilation and aeration 3 and 4, each covered with ventilation grids 8 respectively, are provided for in said cover member 7. By providing for an upper opening 3 and a lower opening 4, the air can circulate along the backside of the device to be ventilated.

For maintenance of said device 2, said cover member 7 simply is moved away from or pivoted away from said service opening 6. Due to the comparatively small thickness of said cover member 7, the device 2 can in addition be placed closer to the external wall and thus to the environment 5, wherein it can project into or nest within the space defining the opening 6 so as to increase the interior volume of the vehicle.

Figure 2:
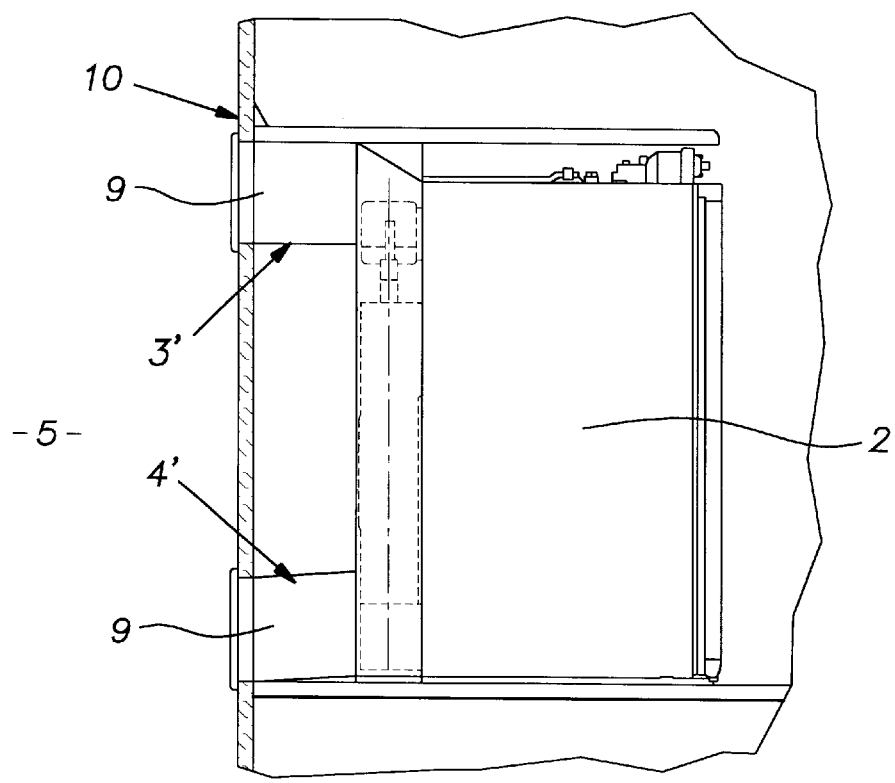
FIG. 2 shows a second embodiment of an exterior recreational vehicle wall or mounting wall in accordance with the present invention in side view.
Figure 3:
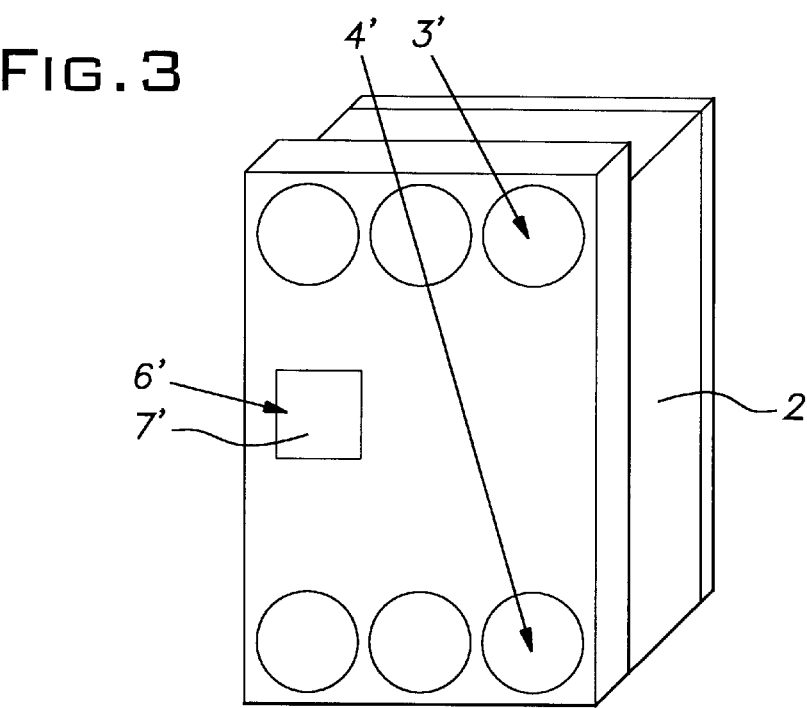
FIG. 3 is a perspective view of the mounting wall shown in FIG. 2.

In the embodiment shown in FIGS. 2 and 3, a smaller service opening 6' is disposed between upper openings 3' and lower openings 4' for ventilation and aeration. Said service opening 6' is closed by a corresponding cover member 7'. Flexible hoses 9, leading to the backside of said device 2 for ventilating it, are received in said openings 3', 4' for ventilation and aeration. Thereby, said device 2 can be positioned with differing distance to the external wall 10 of the vehicle depending on the user's needs. The space behind said device 2 can be made use of for other purposes, such as storage.

It also is possible to combine the first embodiment (FIG. 1) with the second embodiment (FIGS. 2, 3) so that in case of a large-area cover member, flexible hoses are provided for in the marginal area. Said cover member and said vehicle wall in the area of said device can be constructed at minimal thickness in order to increase the useful interior volume of the vehicle. In addition, various means for sealing the inside room against the environment 5 can be provided for, a sealing band being fixed around said device 2 preferably engaged against the wall 10.

What is claimed is:

1. A mobile vehicle, the vehicle having an interior for use by a vehicle occupant, the vehicle comprising:
   an enclosure separating the interior of the vehicle from an environment external to the vehicle, the enclosure including a wall structure;
   a device providing at least one household amenity function, the device being located on the vehicle adjacent to the wall structure to provide the amenity function, at a first side of the device, to the vehicle user located within the vehicle interior, the device having a ventilation communication requirement, at a second side of the device, for ventilation with the external environment, and the device having a serviceable aspect on the second side of the device; and a cover installed on the wall structure adjacent to the device;

wherein the wall structure including a first wall segment, a service opening extending through the first wall segment, the wall structure including a second wall segment extending transverse to the first wall segment at the service opening and partially bounding a nest space for the device, the second wall segment terminating within the interior of the vehicle to permit the vehicle user to use the amenity function provided by the device, the device being sized relative to the nest space to fit within the nest space, the device being sized relative to the service opening such that the device may pass through the service opening and the service opening providing access to the second side of the device, the cover being positionable at the service opening to extend over the service opening, the cover having a ventilation opening to permit ventilation of the device, and the cover being movable to expose the service opening.

2. A mobile vehicle as set forth in claim 1, wherein the second wall segment extends above and below the device.

3. A mobile vehicle as set forth in claim 1, wherein the device is a refrigerator.

4. A mobile vehicle as set forth in claim 1, wherein the cover includes a lock to secure the cover over the service opening.

5. A mobile vehicle as set forth in claim 1, wherein the cover includes two ventilation openings.

6. A mobile vehicle as set forth in claim 5, wherein the two ventilation openings include an upper ventilation opening and a lower ventilation opening.

7. A mobile vehicle as set forth in claim 1, wherein the service opening is sized relative to the device to provide access to the entire second side of the device.

8. A mobile vehicle as set forth in claim 1, wherein the cover includes a hinged flap.

9. A mobile vehicle as set forth in claim 1, including a flexible hose that provides a ventilation conduit and that is attached to the cover.

10. A mobile vehicle as set forth in claim 9, including a second flexible hose that provides another ventilation conduit and that is attached to the cover.

11. A mobile vehicle as set forth in claim 1, wherein the cover has a grid across the opening.

12. A mobile vehicle as set forth in claim 1, including means to secure the device to the wall structure.

13. A mobile vehicle as set forth in claim 1, including means to seat between the device and the wall structure.

* * * * *